United States Patent [19]
Fischer

[11] Patent Number: 5,338,175
[45] Date of Patent: Aug. 16, 1994

[54] EXTRUSION BLOW MOLDING APPARATUS FOR MAKING HOLLOW PLASTIC ARTICLES

[76] Inventor: Rainer Fischer, Poststrasse 39, 3530 Warburg 2, Fed. Rep. of Germany

[21] Appl. No.: 33,249

[22] Filed: Mar. 16, 1993

[30] Foreign Application Priority Data

Mar. 19, 1992 [DE] Fed. Rep. of Germany ....... 4208921

[51] Int. Cl.⁵ ............................................. B29C 49/04
[52] U.S. Cl. ................................. 425/185; 264/542; 425/190; 425/532; 425/534
[58] Field of Search ............... 425/532, 185, 190, 534, 425/183; 264/540-542, 524

[56] References Cited

U.S. PATENT DOCUMENTS

| | | | |
|---|---|---|---|
| 3,640,661 | 2/1972 | Gasior et al. | 425/532 X |
| 3,738,788 | 6/1973 | Langecker | 264/540 X |
| 3,972,669 | 8/1976 | Mehnert | 425/532 X |
| 4,022,561 | 5/1977 | Strong | 425/532 |
| 4,043,734 | 8/1977 | Dybala et al. | 425/534 X |
| 4,118,452 | 10/1978 | Myers et al. | 425/534 X |
| 4,120,634 | 10/1978 | Michel et al. | 425/534 X |
| 4,165,213 | 8/1979 | Mehnert | 425/534 X |
| 4,468,368 | 8/1984 | Hafele | 425/532 X |

*Primary Examiner*—Richard L. Chiesa
*Attorney, Agent, or Firm*—Feiereisen & Kueffner

[57] ABSTRACT

An extrusion blow molding apparatus for making hollow plastic articles includes a machine frame with an extruder horizontally received in the machine frame and having a nozzle head for vertically extruding a parison at one end face of the machine frame. A pair of split blow molds is disposed at this end face of the machine frame bilaterally underneath the nozzle head, with each blow mold cooperating with a blow mandrel secured to the machine frame above the blow mold. The extruder together with its drive and supply lines and at least one of the blow mandrels are detachably received in the machine frame so as to allow a positional exchange therebetween for allowing blow molding of round plastic articles as well as flat plastic articles.

1 Claim, 3 Drawing Sheets

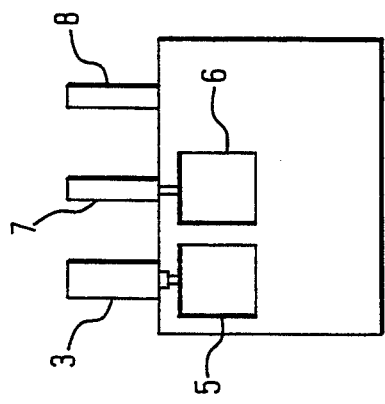
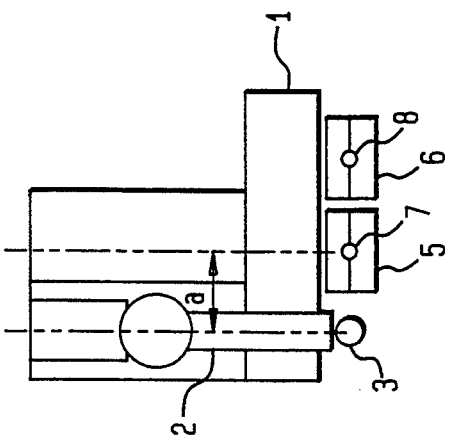
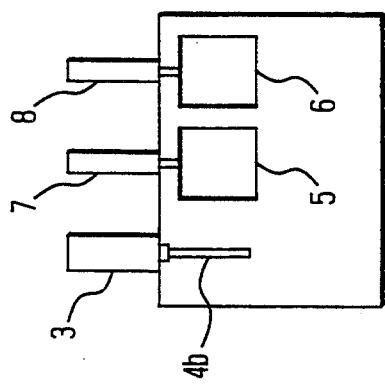
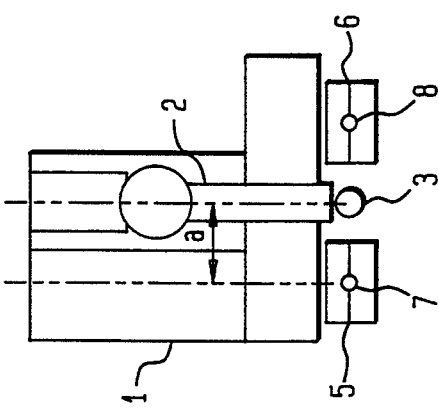
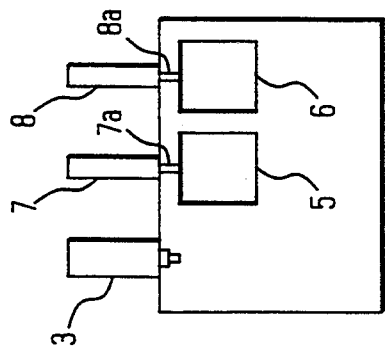

EXTRUSION BLOW MOLDING APPARATUS FOR MAKING HOLLOW PLASTIC ARTICLES

BACKGROUND OF THE INVENTION

The present invention refers to an extrusion blow molding apparatus for making hollow plastic articles.

An extrusion blow molding apparatus is known of the type having a machine frame which receives a horizontal extruder for vertically extruding a parison via its nozzle head at one end face of the machine frame. A pair of split blow molds is arranged symmetrically at the end face below the nozzle head, with each of the blow molds including a closing unit, a drive unit for horizontally sliding the blow mold underneath the nozzle head for receiving an extruded parison, and a blow mandrel secured to the machine frame above the blow mold.

An extrusion blow molding machine of this type is suitable for making hollow plastic articles of rotationally symmetrical cross section such as e.g. round bottles. Both blow molds are identical final blow molds which are moved horizontally by their respective drive unit from their initial position underneath the associated blow mandrel to a position underneath the nozzle head for seizing the parison being extruded by the nozzle head of the extruder. The parison is then blown to the finished hollow article by the respective blow mandrel after returning the respective blow mold into its initial position, with the finished hollow article being ejected after a suitable cooling period.

Such an extrusion blow molding apparatus is, however, not suitable for producing flat bottles since the construction lacks structural elements for transferring a semi-finished article from an intermediate blow mold to the final blow mold.

The European publication EP-PS 0 256 062 discloses an extrusion blow molding apparatus which includes two blow molds of different configuration for making flat bottles. One of the blow molds is an intermediate blow mold for making a semi-finished article of rotationally symmetrical cross section and the other blow mold represents a final blow mold by which this semi-finished article is transformed to a flat bottle. In this manner, flat bottles can be made through a particular material-saving process and with nearly even wall thickness at least over a major part of its height. The European application EP-PS 0 256 062 is, however, silent about the structure and design of the extrusion blow molding apparatus.

The production of hollow plastic articles of rotationally symmetrical cross section and hollow plastic articles of a cross section deviating therefrom necessitates the availability and operation of a separate extrusion blow molding apparatus for each type of hollow article. Depending on the order situation for both types of hollow articles, long stop periods for one or the other blow molding apparatus can be experienced and is unavoidable.

SUMMARY OF THE INVENTION

It is thus an object of the present invention to provide an improved extrusion blow molding apparatus obviating the aforestated drawbacks.

In particular, it is an object of the present invention to provide an improved extrusion blow molding apparatus which is easily convertible as to allow making of round hollow plastic articles as well as hollow plastic articles of a configuration other than of round cross section.

These objects, and others which will become apparent hereinafter, are attained in accordance with the present invention by securing the extruder together with its drive and supply lines, and at least one of the blow mandrels in such a manner to the machine frame as to allow a positional exchange between the extruder and the one blow mandrel. Thus, the positions of the extruder and the one blow mandrel can be interchanged.

By allowing a positional exchange between the extruder and at least one of the blow mandrels, the extrusion blow molding apparatus is easily convertible from one type to another type to carry out a blow molding of round plastic articles by positioning the extruder between both blow mandrels, and to carry out a blow molding of plastic articles of different configuration by positioning the one blow mandrel between the extruder and the other blow mandrel.

BRIEF DESCRIPTION OF THE DRAWING

The above and other objects, features and advantages of the present invention will now be described in more detail with reference to the accompanying drawing in which:

FIG. 1 is a schematic and simplified plan view of an extrusion blow molding apparatus in accordance with the present invention, illustrating a setup for making round bottles;

FIG. 2 is a schematic and simplified plan view of the extrusion blow molding apparatus according to the invention in a setup for making flat bottles;

FIGS. 2a–2i are schematic front views of the blow molding apparatus according to FIG. 2, illustrating successive steps for making flat bottles.

DETAILED DESCRIPTION OF PREFERRED EMBODIMENTS

Figure 1A:
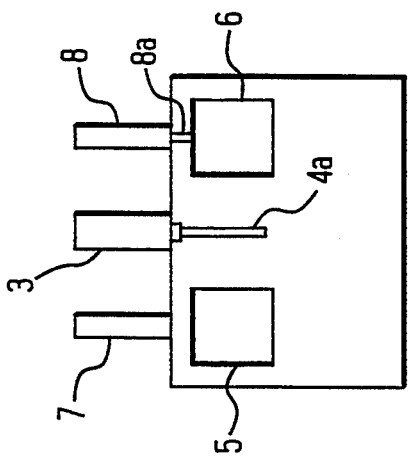
FIGS. 1a–1f are schematic front views of the extrusion blow molding apparatus according to FIG. 1, illustrating successive steps for making round bottles.

Throughout all the Figures, the same or corresponding elements are always indicated by the same reference numerals.

Referring now to the drawing and in particular to FIG. 1, there is shown a schematic and simplified plan view of an extrusion blow molding apparatus according to the invention, including a machine frame 1 which carries an extruder 2 of any suitable type, for example a screw extruder or ram extruder. The extruder 2 ends in a nozzle head 3 which is shown in FIG. 1 only schematically and is located at a distance to an end face of the machine frame 1.

In FIG. 1, the extrusion blow molding apparatus is set up for making round bottles and includes a pair of split blow molds 5 and 6 which are respectively arranged at each side of the nozzle head 3. The partition plane of the blow molds 5 and 6 is oriented in a vertical plane which contains also the axis of the nozzle head 3.

It will be appreciated by persons skilled in the art that the blow molds 5, 6 must contain much mechanical apparatus which does not appear in the drawing. For example, the blow molds 5, 6 are provided with a closing mechanism for opening and closing the blow mold, and drives by which the blow molds 5, 6 are horizontally moved back and forth about a distance, indicated by reference character a. However, this apparatus, like much other necessary apparatus, has been omitted from the drawing for the sake of simplicity.

Arranged above each blow mold 5, 6 is a pertaining blow mandrel 7, 8. An actuating mechanism for these blow mandrels 7, 8 is also omitted from the drawing for the sake of simplicity.

In the setup of the extrusion blow molding apparatus according to FIG. 1, the extruder 2 with the nozzle head 3 is centered between the blow molds 5, 6 and serves for blow molding round bottles, as will now be described with reference to FIGS. 1a–1f which illustrate successive steps of a working cycle.

Figure 1B:
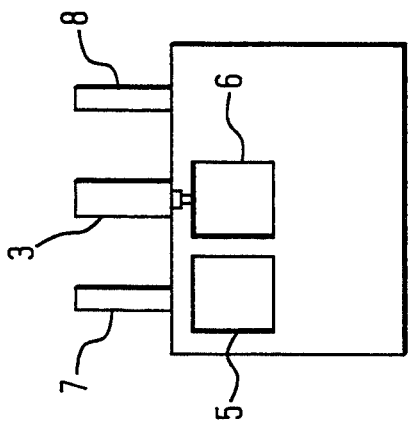
Figure 1C:
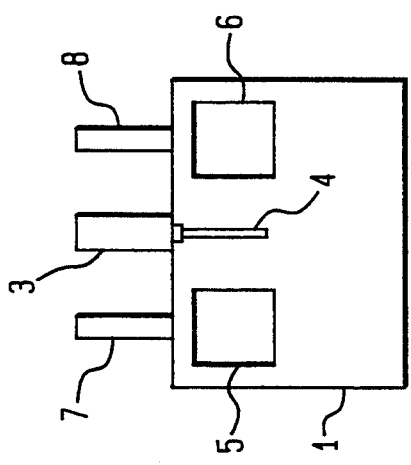

In FIG. 1a, the blow molds 5, 6 are of identical configuration and are positioned at each side of the nozzle head 3, with both molds 5, 6 being open. A parison 4 of suitable length is extruded by the nozzle head 3, and the blow mandrels 7 and 8 are in their risen position. The mold 6 is then shifted sideways under the nozzle head 3, as shown in FIG. 1b, and is closed to thereby seize the simultaneously severed parison 4. Subsequently, the blow mold 6 is returned to its initial position, as shown in FIG. 1c, and the right blow mandrel 8 enters with its blow nozzle 8a the mouth of the parison 4 to introduce air and to blow the parison to the desired shape of the mold to assume a round bottle configuration. At the same time, the nozzle head 3 has extruded a further parison 4a.

Figure 1D:
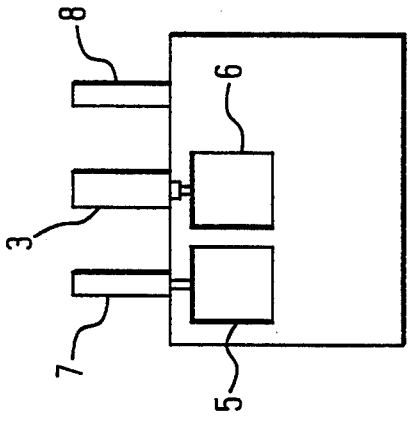
Figure 1E:
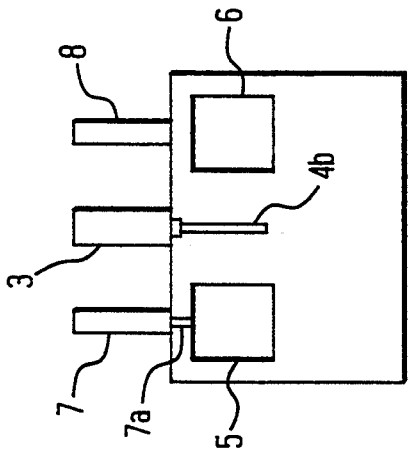

Next, as shown in FIG. 1d, the left blow mold 5 is shifted underneath the nozzle head 3 to seize the new parison 4a. Then, as shown in FIG. 1e, the blow mold 5 is returned to its initial position, with the blow mandrel 7 occupying its lowered position to allow nozzle 7a to introduce air and to blow the parison to the shape of the mold 5. A finished article is contained in each of the blow molds 5, 6 and is ejected after a suitable cooling period.

Figure 1F:
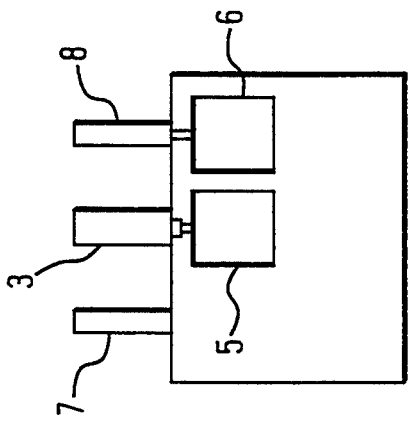

As shown in FIG. 1f, the blow mold 6 is then moved sideways underneath the nozzle head 3 to start a new cycle by seizing the new parison 4b in correspondence with FIG. 1b.

Turning now to FIG. 2, there is shown a plan view of the extrusion blow molding apparatus according to the invention in a different setup, with the difference to the setup in FIG. 1 residing in the changed placement of the extruder 2 including its nozzle head 3 and the blow mandrel 7. The extruder 2 and the blow mandrel 7 are each put in the place of the other by the distance a, with the blow mandrel 7 thus now being centered between the blow nozzle 3 of the extruder 2 and the other blow mandrel 8. In this configuration, the extrusion blow molding apparatus is used for blow molding hollow plastic articles deviating from a circular cross section.

It will be appreciated by persons skilled in the art that the displacement of the extruder 2 and the blow mandrel 7 can be accomplished in various manners. However, these elements have been omitted from the drawing for the sake of simplicity. For example, a constructive solution may simply be realized by detachably securing the extruder and the one blow mandrel to the machine frame. Suitably, the machine frame 1 is equipped with identical fastening means, with the extruder and at least the one blow mandrel being attached by suitable dowel pins or other centering devices.

A further modification between the setup of the extrusion blow molding apparatus according to FIG. 2 compared to the one shown in FIG. 1 resides in the configuration of the blow molds 5, 6 which now perform different tasks and thus have mold cavities of different configuration. The blow mold 5 represents a pre-form blow mold, with a mold cavity of at least approximately circular cross section, while the blow mold 6 represents a final blow mold, with a mold cavity corresponding to the negative of the flat bottle to be blown.

Figure 2A:
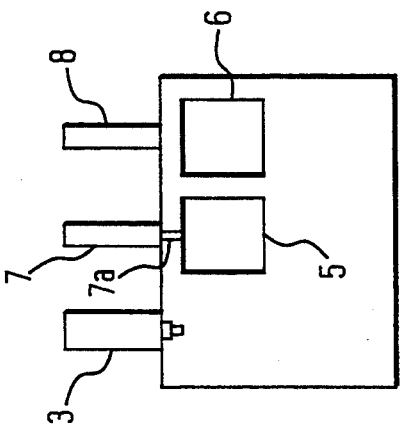
Figure 2B:
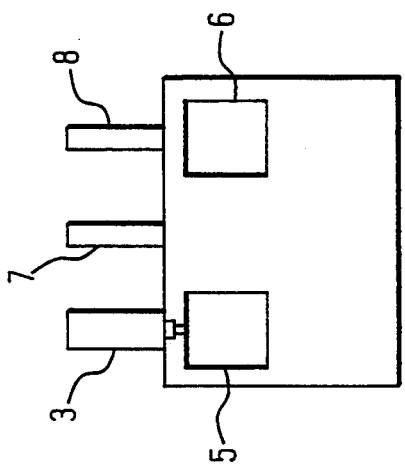
Figure 2C:
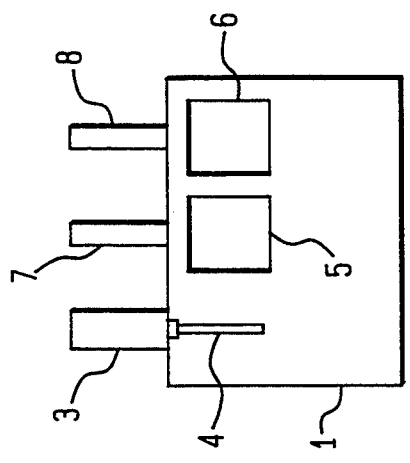
Figure 2D:
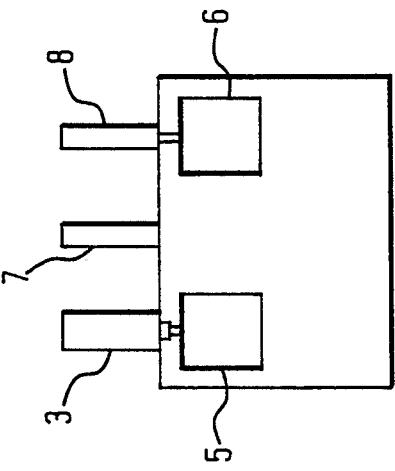

In the initial stage, as shown in FIG. 2a, both blow molds 5, 6 are open, with the pertaining blow mandrels 7, 8 occupying their upper or retracted position, and with the nozzle head 3 extruding a first parison 4. Subsequently, as shown in FIG. 2b, the pre-form blow mold 5 is moved sideways to the left underneath the nozzle head 3 to seize the parison 4. The pre-form blow mold 5 is then returned to its initial position, with the lowered nozzle 7a of the blow mandrel 7 entering the parison 4 to introduce air and to blow the semi-finished article to the shape of the cavity of blow mold 5, as shown in FIG. 2c. Next, as shown in FIG. 2d, the nozzle head 3 has extruded a further parison 4a. The pre-form blow mold 5 is opened, with the semi-finished article being suspended from the nozzle 7a of the blow mandrel 7. The final blow mold 6 remains open.

Figure 2E:
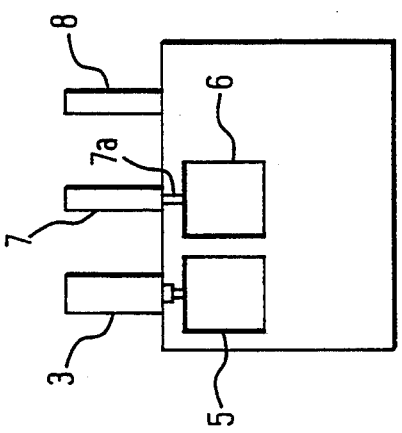
Figure 2F:
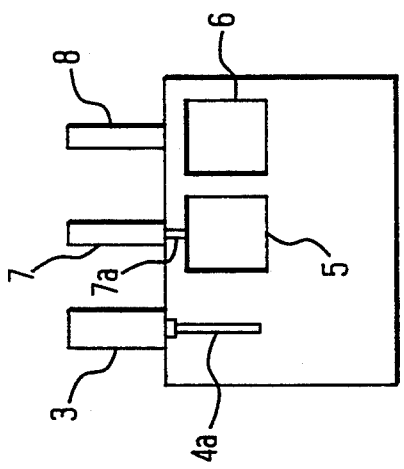

Subsequently, the pre-form blow mold 5 and the final blow mold 6 are moved sideways essentially in synchronism to the left to move the pre-form blow mold 5 underneath the nozzle head 3 and to move the final blow mold 6 underneath the blow mandrel 7, as shown in FIG. 2e. After closing the final blow mold 6 and possibly briefly introducing air, the nozzle 7a of blow mandrel 7 is moved upwards. In FIG. 2f, the final blow mold 6 is returned to its initial position, with the nozzle 8a of the blow mandrel 8 being in the lowered position to introduce air and to blow the semi-finished article to the shape of the finished flat bottle. The pre-form blow mold 5 seizes the new parison 4a from the nozzle head 3. Next, as shown in FIG. 2g, the pre-form blow mold 5 is returned to its initial position, with the pertaining nozzle 7a of the blow mandrel 7 being in the lowered position, and with the respective blow pressure being built up and maintained in both blow molds 5, 6. In the next step, as shown in FIG. 2h, both blow molds 5, 6 are opened, with the semi-finished article and the finished flat bottle being suspended from the respective nozzles 7a, 8a. At the same time, the nozzle head 3 extrudes a further parison 4b. After ejecting the finished flat bottle, the nozzle 8a of blow mandrel 8 occupies its risen position and the pre-form blow mold 5 is moved sideways underneath the nozzle head 3 to seize the new parison 4b while the final blow mold 6 is moved underneath the blow mandrel 7 to seize the semi-finished article suspended from the nozzle 7a of the blow mandrel 7, as illustrated in FIG. 2i. This concludes a complete cycle. The next cycle starts with the position as shown in FIG. 2e.

While the invention has been illustrated and described as embodied in an extrusion blow molding apparatus for making hollow plastic articles, it is not intended to be limited to the details shown since various modifications and structural changes may be made without departing in any way from the spirit of the present invention.

What is claimed as new and desired to be protected by Letters Patent is set forth in the appended claims.

I claim:

1. An extrusion blow molding apparatus for making hollow plastic articles; comprising:
   a machine frame having one end face;

an extruder horizontally received in said machine frame and having a nozzle head for vertically extruding a parison at the end face of said machine frame; and a pair of split blow molds arranged at the end face of said machine frame bilaterally underneath said nozzle head, each of said blow molds including a closing unit, a drive unit for horizontally moving one said blow mold underneath said nozzle head for seizing an extruded parison, and a blow mandrel secured to said machine frame above one said blow mold, said extruder together with its drive and supply lines and at least one of said blow mandrels being secured to said machine frame with means for allowing a positional exchange therebetween so that said extruder occupies a previous position of one said blow mandrel while one said blow mandrel occupies a previous position of said extruder.

* * * * *